March 11, 1941.  W. F. HENRY  2,234,492
ANTISKID DEVICE
Filed Oct. 5, 1939   2 Sheets-Sheet 1
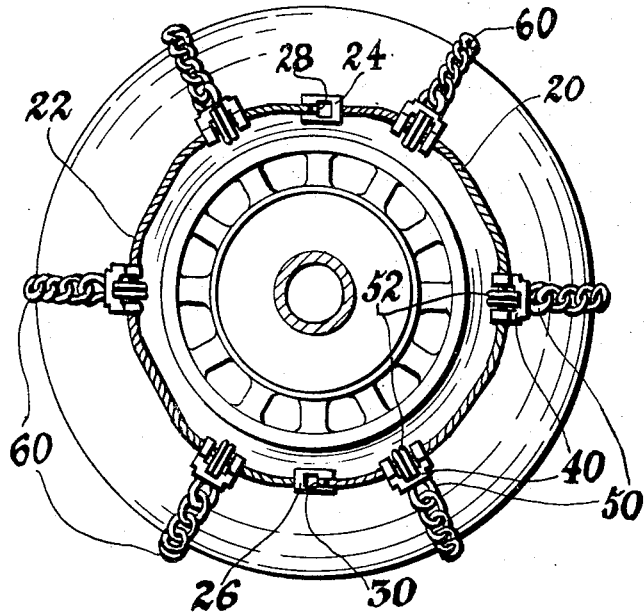
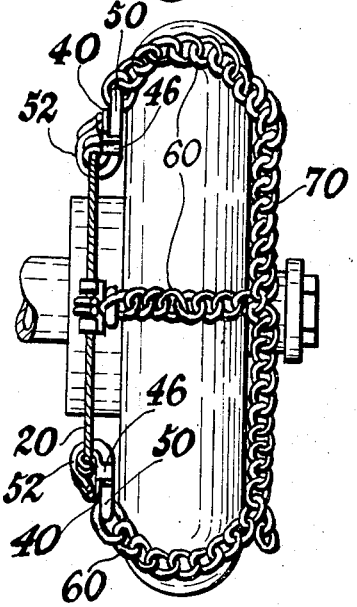
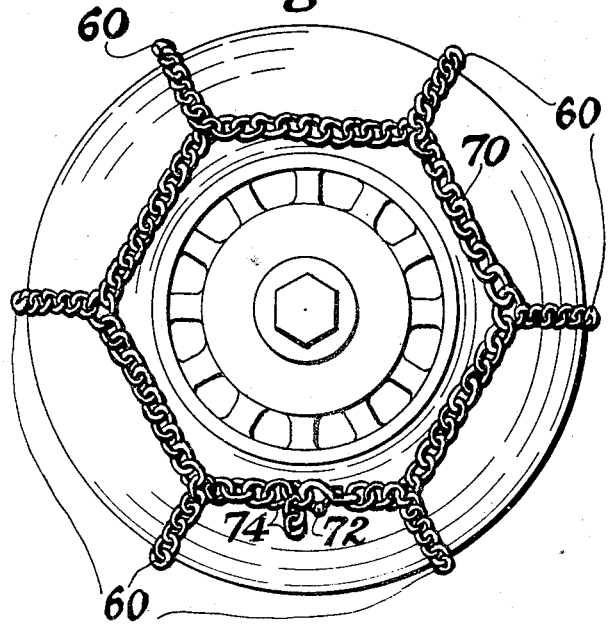
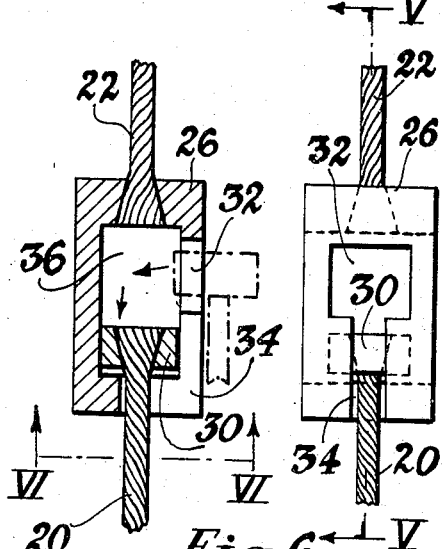
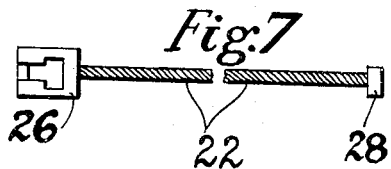
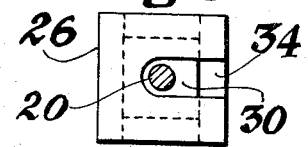
INVENTOR.
William F. Henry
BY
AGENT.

March 11, 1941.   W. F. HENRY   2,234,492
ANTISKID DEVICE
Filed Oct. 5, 1939   2 Sheets-Sheet 2
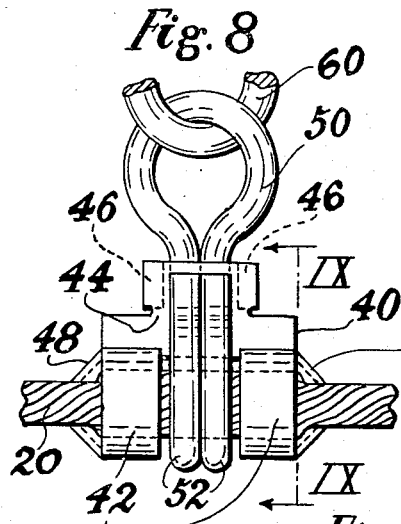
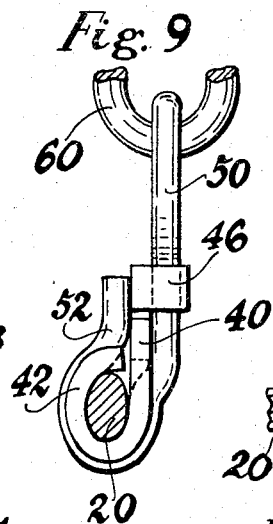
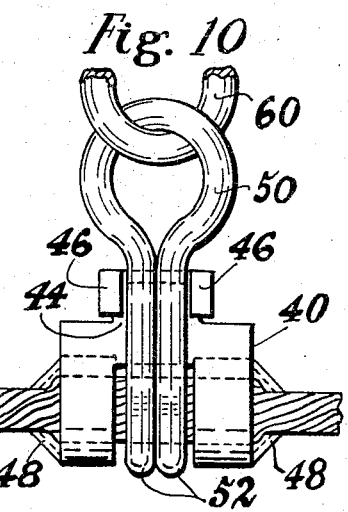
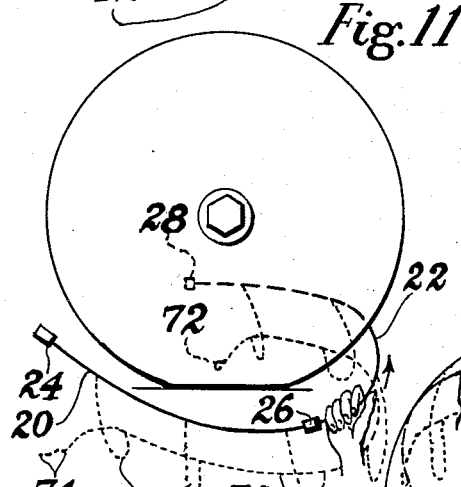
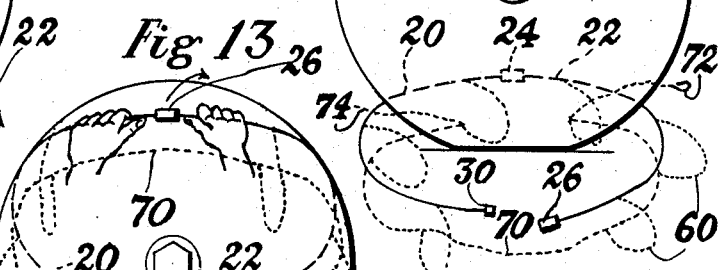
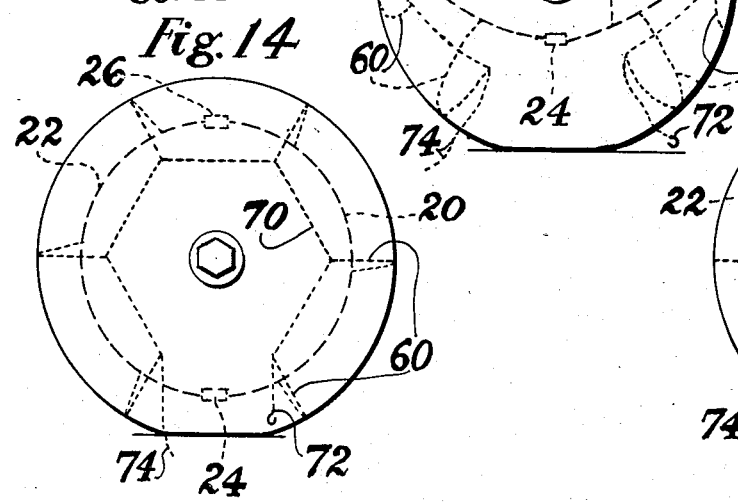
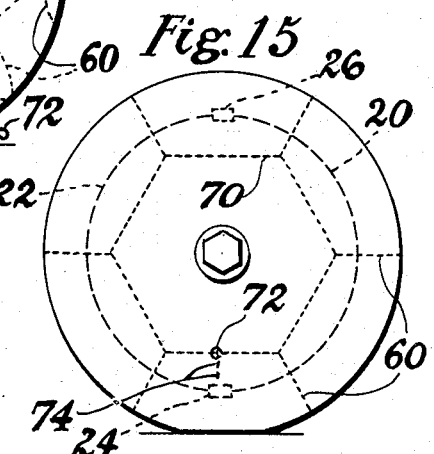
INVENTOR.
William F. Henry
BY Albert B. Befalardi
AGENT Patented Mar. 11, 1941

2,234,492

UNITED STATES PATENT OFFICE 2,234,492

ANTISKID DEVICE

William F. Henry, North Braddock, Pa.

Application October 5, 1939, Serial No. 298,036

6 Claims. (Cl. 152—242)

This invention pertains to antiskid devices for vehicle wheels and particularly to those of the integral type in which the device extends over the whole periphery of the wheel.

The various devices heretofore employed to prevent skidding of vehicles, such as tire-chains, have the drawback that their assembly with the wheels necessitates lifting or moving the vehicle and requires often tedious work beneath the vehicle involving danger of injury to the operator and his clothes; they also have a tendency to become knotted and entangled calling for an additional straightening-out operation.

My invention obviates above and other drawbacks by providing an antiskid device for vehicles which can be placed all around the wheels and tires, respectively, while they rest on the ground, without the necessity to move the car or to use any tools and I achieve this by the novel construction which also enables that all assembly work is to be done at easily accessible locations in front of the wheel at a suitable distance from the fender quickly and safely.

Hence one object of my invention is to provide an antiskid device for vehicle wheels having pneumatic or other tires, which device can be quickly and conveniently assembled with or removed from the wheels without using any tool and without moving or lifting the vehicle and/or without deflating or collapsing the tire.

Another object is to provide a device of the character described which, unfolded, possesses sufficient stiffness against buckling so that it may be pushed into the desired position against the frictional resistance, due to its weight, without collapsing it.

A further object is to provide such a device which can be assembled with tires of different dimensions, within predetermined limits, by adjusting said device at a single point of locking.

Still another object is to provide an antiskid device which has one sufficiently stiff, under pushing not collapsing face member carrying rigidly fixed anchorplates holding the end-links of articulated antiskid members firmly attached in fixed angular position thereto, said end-link forming with the attached anchorplate a crankbell which automatically tightens the face member upon the wheel under the pull of the gripping antiskid member.

And a further object is to provide a device of the type described in which transverse antiskid members are arranged across the tire and connected to face members on each side of the wheel, one of which face members being flexible, is sufficiently stiff, split and connected by couplings to form selectively open and closed shapes of fixed length carrying rigidly attached anchorplates adapted to hold the end-articulations of the antiskid members in predetermined fixed relative position to said stiff face member.

Still a further object is to provide an antiskid device in which transverse chain-end-links, provided with hooks, grip anchor-plates rigidly fixed to sufficiently stiff, buckling resisting wire ropes connected by tension- and torque-transmitting couplings forming a selectively open and closed face member arranged on a side-face of a wheel.

And another object is to provide a simple, inexpensive and reliable tension- and torque-transmitting coupling for wire ropes employed in antiskid devices.

And still another object is to provide an antiskid device in which the transverse chains are connected to a flexible, sufficiently stiff, buckling resisting wire rope by means of end-links rigidly fixed to said wire rope.

And a further object is the provision of means for automatic tightening of the device on the wheel by the force of traction counteracting slipping and resiliently absorbing dynamic stresses.

Another object is to provide a device of the character described which is simple, durable, inexpensive in construction and reliable in operation.

With these and other objects in view my invention consists in the novel construction, combination and arrangement of parts hereinafter described, distinctly pointed out in the claims and illustrated in the accompanying drawings in which Fig. 1 is an elevational semi-diagrammatic view of a motor vehicle wheel having upon which my antiskid device is mounted in operative position;

Fig. 2 is an elevational semi-diagrammatic view from the other side of the wheel and antiskid device shown in Fig. 1;

Fig. 3 is a front elevational view of the same wheel and antiskid device;

Fig. 4 is a side elevational view of a wire rope coupling to a greatly enlarged scale;

Fig. 5 is a sectional view on the line V—V in Fig. 4;

Fig. 6 is a view on the line VI—VI in Fig. 5;

Fig. 7 is an elevational view to an enlarged scale of a wire rope, forming part of the flexible face member, with attached coupling parts;

Fig. 8 is the elevational view to a greatly enlarged scale of an anchor plate fixed to the flexible face member and assembled with the end-link of a transverse chain shown broken away;

Fig. 9 is a view on the line IX—IX in Fig. 8;

Fig. 10 represents the detail shown in Fig. 8 but viewed from the opposite side;

Figs. 11, 12, 13, 14 and 15 show in diagrammatic elevational views the successive steps of assembling my antiskid device with the vehicle wheel and tire without lifting or moving the wheel or operating beneath the car.

Like reference characters indicate like parts throughout the following specification and the several views of the drawings.

Referring closer to the drawings by the characters of reference, 20 and 22 are predetermined and preferably equal lengths of flexible means such as wire rope of suitable dimensions and stiffness, each provided with a coupling 24 and 26 fixed to one of their endportions and with an endblock 28 and 30, respectively, attached rigidly to the other endportion.

Fig. 7 shows the wire rope 22, its coupling 26 and its endblock 28 to an enlarged scale, while Figs. 4, 5 and 6 illustrate the coupling 26, the endblock 30 and portions of the wire ropes 20 and 22, to which they are rigidly fastened, to a greatly enlarged scale. By means of the couplings and endblocks the two lengths of wire ropes are united into a face member of a closed loop-shape assembled upon the inner-side face (toward the center of the vehicle) of the wheel and tire, respectively.

The couplings 24 and 26 form elongated hollow prisms with two open sides and at the center of their bases they are rigidly fixed by soldering, brazing, welding, riveting or other approved manner to the endportion of elongated flexible means such as wire ropes. In the exemplary embodiment I show the coupling bases being provided with a conical hole in which the end of a wire rope is inserted, spread out and fixed by welding or brazing. One side of the prism has an opening 32 continuing in split 34 for insertion (as shown in Fig. 5 in dots and dashes and arrows) of the coacting end-block 30 and wire rope 20, to the endportion of which the endblock 30 is rigidly fixed in any approved manner. The shape of the end-blocks 28 and 30 is prismatic and fits the prismatic cavities 36 of the couplings so that relative angular displacement between them, hence also between the wire ropes 20 and 22, is prevented and the couplings become tension- and torque-transmitting. In the exemplary embodiment the couplings, their cavities and the endblocks have the shapes of four-sided prisms.

A plurality of forked anchor plates 40, having prongs 42 and base portion 44, are rigidly fixed, preferably equally spaced from each other, to the wire ropes 20 and 22, respectively, by crimping prongs 42 over them and, in addition, by soldering, brazing, welding, riveting or otherwise fastening them to said wire ropes which are compressed to a substantially oval cross section preventing any relative axial or peripheral displacement of the anchor plates relative to the wire ropes. The base portion 44 of anchorplate 40 is provided with protruding stops 46 forming a channel suitable to receive the end-link 50 of the transverse antiskid members, shown to be chains, 60. As best shown in Figs. 8 to 10, the hooked endportion 52 of end-links 50 is crimped over the wire rope and grips firmly the anchor plate 40 which keeps the whole end-link in substantially predetermined fixed relative position to the wire rope 20. By this I achieve two objectives, first that the transverse chains or antiskid members are always held in proper spacing and position and their entanglement is avoided facilitating the handling, assembling and storing of the device and second, that the wire rope is automatically tightened on the wheel when the antiskid member grips the ground and pulls non-radially on the end-link which forms one lever of a bell crank, the other being the anchorplate 40 which respondingly oscillates and puts a kink or wave in the wire rope.

The achievement of this second objective yields an additional beneficial result, namely the automatic tightening of the whole device on the tire during operation by the traction force which increases friction and counteracts the tendency of slipping of the device on the tire. Furthermore the elastic deformation of the arcuate wire rope into a wavy shape gives added resiliency to the device, absorbing dynamic stresses, averting breakage so that not only the effectiveness but also the safety of the device is greatly enhanced.

As best shown in Figs. 2 and 3, the other ends of the transverse antiskid members or chains 60 are at suitable points linked to the second face member 70 mounted upon the outer side face of the tire and wheel, respectively. This second face member 70 may be any tension resisting element, such as a chain shown, provided with an approved connector, as for example the buckle 72, and with length regulating means, such as a plurality of terminal-links 74 adapted to selectively cooperate with buckle 72, whereby the length of the closed chain may be adjusted within predetermined limits.

To make the operation and advantages of my invention better understandable I illustrate in Figs. 11 to 15 the successive steps of the assembly of the preferred embodiment with the tire and wheel without lifting or moving the latter and showing that all work is to be done in freely accessible spaces. In these figures those portions of the wire ropes which are behind the wheel are shown by long dashes, while all chain portions are represented by short dashes, irrespective whether they are in front of, or behind the wheel, as this location is made clear by the connection with the wire rope portion.

Fig. 11 shows the first step which consists in introducing one open end, with end-block 28, of wire rope 22, together with the opened chain 70 and the transverse chains 60, behind the wheel and below the vehicle axle and pushing it into a position in which both end-block 28 and coupling 24 appear in front of the lower part of the wheel, in a freely accessible space, where they can be easily connected. By employing suitably stiff wire rope the device can be pushed into proper position against the resistance due to the friction on the ground caused by the weight of the pushed portion, without buckling of the device. During assembly the wire ropes should lay on top of the chains the latter being dragged on the ground.

Fig. 12 shows the second step of the assembly which consists in shifting the device on the ground around the wheel so that the closed coupling 24 is below the vehicle axle behind the wheel, then opening up coupling 26. Also this operation is carried out by getting hold of the stiff wire rope at a convenient portion in front of the wheel and pushing it into position without the necessity of reaching behind the wheel or working within any, not easily accessible space.

Fig. 13 illustrates the third step consisting in lifting the opened ends (at coupling 26) of the wire ropes and the chain portions connected with them over the wheel and tire and then connecting the coupling 26 with endblock 30 within the space in front of the upper part of the wheel and afterwards tossing it in the direction of the arrow behind the wheel. This step does not require any work to be done behind the wheel or between the fender and the wheel either.

Fig. 14 represents the result of the fourth step which consists in pulling the chain members 60 and 70 into their substantially operative position on the tire. As chain 70 is entirely in front of the wheel and chains 60 half-way so, this operation is done in an easily accessible space and without any inconvenience.

Fig. 15 pictures the last step consisting in assembling the buckle 72 with the proper terminal-link 74 under sufficient tension for obtaining the final, operating shape of the device. Also this operation is carried out in front of the wheel.

The aforegoing stepwise description of the assembly of my antiskid device with a vehicle wheel makes it clear how the disclosed combination of the structural elements of my invention cooperate to achieve the new and improved result, the quick, convenient and safe mounting of my device: the predetermined length and stiffness of one face member composed of flexible means such as wire ropes, the rigid connection of the end-links therewith holding the antiskid chains always in proper direction avoiding their entanglement and providing self-tightening and shock absorbing effects, the splitting of the flexible face-member and its connection by tension- and torque-transmitting couplings at two locations holding all end-links of the antiskid chains in proper position enabling all assembly work to be done in front of the wheel, away from the fender and outside from other danger zones.

From the foregoing description, taken in connection with the accompanying drawings, the advantages of construction and of the method of operation will be readily apparent to those skilled in the art to which my invention relates, and while I have described the principles of operation of the device together with one exemplary embodiment thereof which I now consider the best, I desire to have it understood that the device shown is merely illustrative and such changes may be made as are within the scope of the appended claims.

What I claim is:

1. Antiskid device for a tire-equipped wheel comprising an inner face member and an outer face member adapted to contact the corresponding side-faces of said wheel along closed curves, a plurality of antiskid chains connected to and extending transversely between said face members for contacting the tread-portion of said tire, said inner face member consisting of flexible, tension-resisting elongated means of predetermined length and of a stiffness substantially equivalent to that which overcomes the frictional resistance developed on the ground by the weight of the device, whereby it can be positioned without collapsing by pushing it on the ground, coupling means fixed to said elongated means for connecting and disconnecting, respectively, portions of the latter at two places, anchoring means for keeping one end-link of each of said anti-skid chains rigidly fixed to said elongated means, said outer face member consisting of tension-resisting articulate means carrying attachment means for selectively connecting different end-links therewith for adjusting the length of the closed portion of said chain.

2. Antiskid device for a tire-equipped wheel comprising an inner face member and an outer face member adapted to contact the corresponding side faces of said wheel along closed curves, a plurality of antiskid chains connected to and extending transversely between said face members for contacting the tread-portion of said tire, said inner face member consisting of flexible wire rope of predetermined length and of a stiffness substantially equivalent to that which overcomes the frictional resistance developed on the ground by the weight of the device, whereby it can be positioned without collapsing by pushing it on the ground, coupling means fixed to said wire rope for connecting and disconnecting, respectively, portions of the latter at two places, anchoring means for keeping one end-link of each of said antiskid chains rigidly fixed to said wire rope, said outer face member consisting of a chain carrying attachment means for selectively connecting different end-links therewith for adjusting the length of the closed portion of said chain.

3. Antiskid device for a tire-equipped wheel comprising an inner face member and an outer face member adapted to contact the corresponding side faces of said wheel along closed curves, a plurality of antiskid chains connected to and extending transversely between said face members for contacting the tread-portion of said tire, said inner face member consisting of flexible wire rope of predetermined length and of a stiffness substantially equivalent to that which overcomes the frictional resistance developed on the ground by the weight of the device, whereby it can be positioned without collapsing by pushing it on the ground, tension and torque transmitting coupling means fixed to said wire rope for connecting and disconnecting, respectively, portions of the latter at two places, a plurality of forked anchor plates rigidly fixed to said wire rope and provided with protruding stops, each of said antiskid chains having an end-link provided with a hook adapted to grip said wire rope and said anchor plate adjacent said stops, said outer face member consisting of a chain having a buckle at one end and links selectively coacting with said buckle at the other end-portion for adjusting the length of the closed portion of said chain.

4. Antiskid device for a tire-equipped wheel according to claim 1 in which one place of connection of said inner face member by said coupling means and the only place of connection of the outer face member are located between the same two antiskid chains and the second connecting place of the inner face member is located between other antiskid chains substantially diametrically opposite of said first connecting place.

5. Antiskid device for a tire-equipped wheel comprising an inner face member and an outer face member adapted to contact the corresponding side faces of said wheel along closed curves, a plurality of antiskid chains connected to and extending transversely between said face members for contacting the tread portion of said tire, said inner face members consisting of two pieces of flexible wire rope of predetermined length and of a stiffness substantially equivalent to that which overcomes the frictional resistance developed on the ground by the weight of the device, whereby it can be positioned without collapsing by pushing it on the ground, a prismatic housing fixed to one end portion of each of said pieces of wire rope, a prismatic end-block fixed to their second end portion, said housings having cavities accommodating said end-blocks and being provided with a suitable opening at one side and with a slot running therefrom to the center of the base for admitting said end-block and the wire rope attached thereto for connecting and disconnecting, respectively, said two pieces of wire rope, anchoring means for keeping one end-link of each of said antiskid chains rigidly fixed to one of said pieces of wire rope, said outer face member consisting of a chain carrying attachment means for selectively connecting different end-links thereof for adjusting the length of the closed portion of said chain.

6. Antiskid device for a tire-equipped wheel according to claim 5 in which said anchoring means consist of a plurality of forked anchor plates welded to one of said pieces of wire rope, said plates being provided with protruding stops and hooks, adapted to grip said wire rope and said anchor plates adjacent said stops, each of said hooks being an integral part of one end-link of said antiskid chains for rigidly connecting said endlink to said wire rope.

WILLIAM F. HENRY.